United States Patent
Nagel et al.

(10) Patent No.: US 6,194,504 B1
(45) Date of Patent: Feb. 27, 2001

(54) PROCESS FOR COMPOUNDING METAL SALTS IN ELASTOMERS

(75) Inventors: Walter R. Nagel; C. Richard Costin, both of West Chester; Gary W. Ceska, Exton, all of PA (US)

(73) Assignee: Sartomer Technologies, Inc., West Chester, PA (US)

( * ) Notice: Subject to any disclaimer, the term of this patent is extended or adjusted under 35 U.S.C. 154(b) by 0 days.

(21) Appl. No.: 08/847,705

(22) Filed: Apr. 28, 1997

(51) Int. Cl.$^7$ .......................................................... C08L 5/09

(52) U.S. Cl. ........................ 524/394; 524/397; 524/398; 524/399; 524/400

(58) Field of Search ..................................... 524/413, 394, 524/397, 398, 399, 400

(56) References Cited

U.S. PATENT DOCUMENTS

| | | | | |
|---|---|---|---|---|
| 4,092,285 | * | 5/1978 | Leo et al. .............................. | 524/418 |
| 4,397,992 | * | 8/1983 | Johansson et al. .................. | 524/305 |

* cited by examiner

*Primary Examiner*—Peter D. Mulcahy
(74) *Attorney, Agent, or Firm*—Michael B. Fein; Cozen & O'Connor

(57) ABSTRACT

A method of making $MA_n$ salt in particulate form having improved dispersibility in elastomers, wherein M is a metal selected from zinc, calcium, and magnesium or other metals, A is acrylate or methacrylate, and n is 1–4, comprising contacting said salt with a solution of polymer in organic solvent, and then removing the solvent, thereby encapsulating said salt with said polymer. The resultant encapsulated metal acrylate salts, methods of use, and the resultant elastomers are also disclosed. The salts are especially useful as scorch retarders used in the processing of elastomers in a two roll mill or Banbury type internal mixer.

6 Claims, No Drawings

PROCESS FOR COMPOUNDING METAL SALTS IN ELASTOMERS

BACKGROUND OF THE INVENTION

This invention relates to metal acrylates which are useful as processing aids for elastomers.

Elastomers such as polybutadiene, hydrogenated nitrile rubber, etc., are usually processed in a two roll mill or a Banbury type internal mixer, with a combination of additives which are added in order to provide the proper curing and physical property characteristics. For peroxide cure systems, metal salts, especially acrylates, are commonly used to improve the efficiency of the cure process. Additional ingredients added to the compound include peroxides, fillers such as zinc oxide, plasticizers, additional coagents, and pigments.

In typical processing of such elastomers, there is a tendency for build-up to occur on the rolls, sides of the mixer, and/or on the rotors. This build-up, if left over several cycles, reduces the heat transfer of the equipment and undesirably lengthens the cycle time. Also, fragments from the build-up can enter subsequent batches and result in non-uniform properties and out-of-specification product. In such cases, it may become necessary to shut down and either run clean-out batches until the equipment is clean, or to mechanically clean the mixer.

Metal acrylates and their interaction with the peroxide and elastomer are frequently a major contributor to the undesirable build-up (also known as plate-out process).

Various methods have been tried in an effort to minimize the tendency for the metal acrylates to plate-out. One such method involves the ordering of the addition of the formulation ingredients. Normally, most of the ingredients are added together to the elastomer with the peroxide being added last. Under these conditions, plate-out is very bad. By adding the metal acrylate first, it is possible to partially encapsulate and minimize the contact of metal acrylate with the ingredients causing the plate-out. This technique has the disadvantage of lengthening the mixing cycle and only partially reducing plate-out.

An alternate technique is surface treating of the metal acrylate particle surface prior to addition to the mixer. Leo, et al., U.S. Pat. No. 4,092,285 assigned to Wyrough and Loser, Inc., discloses the encapsulation of "critical chemical" rubber additives with a mixture of a liquid compatible with the rubber or a wax with a melting point of 55–80° C., and a high molecular weight polymer with molecular weight greater than 50,000. This mixture produces a non-tacky gel below 53° C. which can be coated onto the particle surface. Johansson, et al., U.S. Pat. No. 4,397,992, also assigned to Wyrough and Loser, Inc., discloses the incorporation of a vulcanizing agent or coagent into a polymeric binder composition comprising a major amount of multi-stage graft copolymer along with a high molecular weight hydrocarbon polymer and free radical polymerization inhibitor. This composition results in a non-bleeding homogeneous solid which can be readily dispersed in a rubber or plastic stock by mechanically mixing. However, in the case of metal acrylates, neither the Leo, et al., nor Johansson, et al., processes provide surface treatment of encapsulated metal acrylates which function effectively to prevent plate-out in elastomer processing. Neither of these patents suggests a method which provides an efficient method of coating or treating the metal acrylate particles prior to their incorporation into elastomers.

Metal acrylates, as normally produced, are typically dusty products (approximately 10 microns in diameter) causing odor and inhalation problems when transferred because of dust. In addition, metal acrylates are usually extremely difficult to process on mixing equipment, such that they tend to stick to the mixer metal surfaces (plate-out) resulting in poor dispersion of the metal acrylates in the rubber or elastomer. An additional disadvantage of prior art metal acrylates is the slowness with which they mix into many rubbers due to the polar nature of the particles and charge build-up on the particle surface.

SUMMARY OF THE INVENTION

It is, therefore, an object of the present invention to provide improved metal acrylate cure additives for elastomers which do not cause plate-out or build up in the processing of the elastomers.

It is a further object to provide a method of preparing such improved metal acrylate cure additives, and to methods of processing elastomers with such improved metal acrylate cure additives.

These objects, and others which will become apparent from the following disclosure, are achieved by the present invention which comprises, in one aspect, a method of making $MA_n$ salt in particulate form having improved dispersibility in elastomers, wherein M is a metal selected from zinc, calcium, magnesium, potassium, lithium, aluminum, cobalt, zirconium, sodium, iron, barium, bismuth, etc., A is acrylate or methacrylate, and n is 1, 2, 3 or 4, comprising contacting said salt with a solution of polymer in organic solvent, and then removing the solvent, thereby encapsulating the salt with the polymer.

In another aspect, the invention comprises a composition comprising the resultant $MA_n$ salt in particulate form having improved dispersibility in elastomers, and the improved elastomers themselves.

DESCRIPTION OF THE INVENTION AND PREFERRED EMBODIMENTS

As mentioned, one aspect of the invention is the method of making $MA_n$ salt in particulate form having improved dispersibility in elastomers, wherein M is a metal selected from zinc, calcium, and magnesium and other metals, A is acrylate or methacrylate, and n is 1, 2, 3 or 4, comprising contacting said salt with a solution of polymer in organic solvent, and then removing the solvent, thereby effecting a surface treatment of said salt with said polymer.

Among the metals, M, zinc is the most typical for the type of cure additives most useful for elastomers. Other suitable metals are calcium, magnesium, potassium, lithium, aluminum, cobalt, zirconium, sodium, iron, barium, bismuth, etc., and the like.

The acrylate can be acrylate, methacrylate, ethacryate, and the like, with acrylate itself being most typical. The value for n is most typically 2, so that zinc diacrylate (ZDA) is the most typical of the metal acrylate salts.

The polymer which is used to treat the surface of the metal salt is preferably selected from the group consisting of polybutadiene, EPDM (saturated and unsaturated), hydroxy-terminated polybutadiene, polybutadiene diacrylate, mineral oil, ethylene-butylene diacrylate, natural rubber, polybutene, and the like. The preferred polymer is the one most closely related to the elastomer in which the metal salt will be incorporated as cure additive.

Suitable treatment polymers include, for example, liquid EPDM, e.g., Uniroyal Trilenes, especially CP20, hydroxy terminated liquid polybutadiene e.g., Elf Atochem R45HT, Sartomer CN-301 PEG 500 diacrylate, mineral oil, Ethylene butylene diacrylate, liquid natural rubber e.g., Hammond DPR, liquid polybutadiene, Amoco polybutene, and the like.

The surface treatment of the metal acrylate is accomplished by dissolving the treating polymer in organic solvent and then slurrying the metal salt particles for a short time in the resultant solution. The treatment process can be carried out in the same reactor as is used to prepare the metal acrylate after the metal acrylate reaction is completed, or following removal of the metal acrylate after it is prepared from the reactor in a secondary step.

Improved speed of processing is achieved with treatment according to the invention, as the treating polymer acts as a bridge between the particle and the elastomer.

Heptane is the preferred solvent for the treatment polymer because heptane is the conventional solvent used to prepare the metal acrylate, but other solvents can alternatively be used, if desired. Other suitable solvents include hexane, octane, nonene, toluene, and the like.

The treatment polymer can be incorporated in the solvent at varying concentrations, but a concentration of about 1–5, preferably 2–5 percent on the metal salt appears optimum. Lower concentrations do not completely treat the metal acrylate, while higher concentrations result in excess treatment which sticks to the mixer surfaces and also dilutes the strength of the metal acrylate (via concentration).

Surface treatment according to the invention results in the following outstanding improvements in the mixing of the metal acrylate in elastomer:

1. The metal acrylate is made "dust free."
2. The plate-out problem during the mixing step is eliminated.
3. The metal acrylate mixes more quickly into the elastomer or rubber.

The polymer can be conveniently applied to the metal acrylate by first dissolving the polymer in solvent. The metal acrylate is slurried in the solution. The solvent is next removed, e.g., by vacuum drying, leaving the metal acrylate particles treated with the polymer. By controlling the polymer concentration, an optimum treatment of polymer can be made to the metal acrylate.

The treatment polymer can be added in different ways. For example, it can be added directly to the reactor producing the metal salt. At the end of the reaction phase, just prior to drying the heptane from the metal salt, the separate polymer solution in solvent can be pumped into the reactor. After mixing the polymer with the reaction ingredients for a short time, the solvent is dried, completing the treatment of the metal acrylate.

An alternate approach is to treat the metal acrylate after the reaction is completed by creating a metal acrylate-solvent slurry as described previously.

The polymer used should be preferably low molecular weight, although higher molecular weight polymers could also be used. The higher molecular weight polymers have the drawback of being slower to dissolve in solvent. Surprisingly, the low molecular weight polymer forms a free flowing product after treatment of the metal acrylate particles. The minimum molecular weight for the polymer is about 2000 to avoid tackiness in the metal acrylate particles. The concentrations of polymer in the metal salt should be between 2.0 and 5.0% depending on the salt particle size. Above 5.0% polymer, the treated metal acrylic tends to become greasy.

The present invention is an improvement over previous technology with the use of a single treating compound as opposed to the multi-compound system described in U.S. Pat. Nos. 4,092,285 and 4,397,992. The present invention also provides for a simple and efficient method to treat the metal acrylate by direct addition of the encapsulant to the production reactor.

The effectiveness of the polybutadiene treatments is proven by evaluations involving addition of the metal acrylate with and without treatment and the determination of dusting, plate-out, and ease of incorporation into the compound. Plate-out is eliminated in all cases where the polymer is used, while untreated metal acrylate results in severe plate-out.

In summary, a surface treatment process has been described for treating metal acrylate particles which is simple and easy to accomplish while providing improved processing properties of dust elimination, plate-out elimination, and quicker incorporation of the metal acrylate into the rubber.

The treated metal acrylates (methacrylates) are useful for producing products with improved properties in the following elastomer/peroxide-cured application areas: golf balls, timing belts, roll covers, footwear, O rings, belts, V type, engine mounts, shock absorbers, tennis balls, other sporting equipment, wire and cable coating, sealants, pumpable sealants, rigid profile sealants, sponge expansion joints, hose, coatings, conveyor belts, mats, adhesives, marine paints, gaskets, polymer cement (concrete), bellows, bladders, drilling seals, adhesive tape, wipers, and weatherstripping.

EXAMPLES

Example 1

The following examples are presented to illustrate a few non-limiting embodiments of the invention.

Treated samples of zinc diacrylate (ZDA) were prepared with treatment weights of from 1% to 10% using several treatment polymers. The appropriate amount of treatment polymer per weight of ZDA was dissolved in heptane. For example, for 1% treatment, 1 gm of polymer was dissolved in 100 gm of heptane. Next, 100 gm of ZDA were slurried in the heptane solution for 15 minutes and then the heptane evaporated in an oven at 70° C. while stirring the container periodically. When dried, the resultant product was a dry free flowing power.

Example 2

ZDA was treated with 1%, 2%, 3%, 4% and 5% Elf Atochem's R45HT hydroxy terminated polybutadiene (PBD). The treated ZDA was compounded into an ethylene propylene diene monomer (EPDM) masterbatch as detailed in Table 1. The treated product was observed for dusting, plate-off of the ZDA on the mill roll. ease of incorporation into the compound, and cured rubber properties.

Dusting was eliminated at 3% PBD, however, plate-off required 5% PBD for elimination. The incorporation time was steadily reduced as the PBD content increased. Cured rubber properties remained constant for the entire series of runs.

TABLE 1

| Treatment, % | 0% | 1% | 2% | 3% | 4% | 5% |
|---|---|---|---|---|---|---|
| EPDM 1040 MB (1) | 256 | 256 | 256 | 256 | 256 | 256 |
| Resin D | 1 | 1 | 1 | 1 | 1 | 1 |
| DiCup 40 KE | 7.5 | 7.5 | 7.5 | 7.5 | 7.5 | 7.5 |
| Control | 10 | — | — | — | — | — |
| 1% Treatment | — | 10 | — | — | — | — |
| 2% PBD | — | — | 10 | — | — | — |
| 3% | — | — | — | 10 | — | — |
| 4% | — | — | — | — | 10 | — |
| 5% | — | — | — | — | — | 10 |
| Plate-out | bad | bad | bad | bad | slight | none |
| Dusting | severe | some | some | none | none | none |
| Incorporation Time | long | long | L-S | short | short | short |
| ODR, 320° F. | | | | | | |
| ML, in lb | 6.6 | 7.6 | 7.6 | 6.9 | 7.7 | 7.4 |
| Ts2, min | 1.8 | 1.6 | 1.9 | 1.5 | 1.6 | 1.8 |
| Tc, (90) min | 14.7 | 8.4 | 11.0 | 7.0 | 9.0 | 9.9 |
| MH, in lb | 34.8 | 30.7 | 33.6 | 30.0 | 31.1 | 30.1 |
| Hardness A | | | | | | |
| Peak Tensile, PSI | 1250 | 1310 | 1340 | 1260 | 1340 | 1290 |
| Elongation, % | 710 | 710 | 680 | 630 | 620 | 580 |
| Modulus 100 PSI | 215 | 215 | 215 | 225 | 230 | 225 |

| (1) | Parts |
|---|---|
| Nordel 1040 | 100 |
| N762 Black | 100 |
| Sunpar 2280 | 50 |
| Zinc Oxide | 5 |
| Stearic Acid | 1 |

Example 3

ZDA (zinc diacrylate SR11) treated samples at 1 to 5 percent polybutadiene R45HT were evaluated in polybutadiene cure. Data for PBD golf ball cores is shown below using the generic formulation at 35PHR coagent and 2 PHR DiCup 40KE. (1)

TABLE 2

| | 0% | 1% | 2% | 3% | 4% | 5% |
|---|---|---|---|---|---|---|
| Compression | 93.0 | 94.5 | 94.5 | 92.5 | 94.5 | 94.5 |
| COR$_{125}$(2) | 0.746 | 0.741 | 0.746 | 0.747 | 0.746 | 0.745 |
| COR$_{200}$ | — | — | 0.687 | 0.686 | 0.682 | 0.677 |
| Durability 200 | 2 | 2 | 1 | 1 | 1 | 1 |
| | Fracture | Fracture | Fracture | Fracture | Fracture | Fracture |
| Plate-out | yes | none | none | none | none | none |
| Dusting | severe | some | none | none | none | none |
| Incorporation Time | long | long | short | short | short | short |

For Without treatment, dusting as well as plate-out on the mill was severe. Even with low amounts of treatment, dusting and plate-out was eliminated. Core properties in addition appear to be at least as good as the control with durability at 200FPM (core fracture) possibly improved. Cycle time subjectively measured was reduced with increasing degree of treatment.

| | Parts |
|---|---|
| (1) TAKTENE 1203 PBD | 100 |
| ZINC OXIDE | 7.5 |
| ZDA (SR111) TREATED 0–5% | 35 |
| DiCUP 40 KE | 2 |

(2) COR, Coefficient of Restitution

Example 4

Mineral oil, USP grade, was used to treat ZDA (SR111) at concentrations from 0 to 5% and the treated ZDA cured in EPDM similar to Example 2. Results are shown in Table 3. Dusting was eliminated at 1% encapsulation and plate-out was slight and greatly improved at 3%. Incorporation into the EPDM was improved with cycle time diminishing up to 3% encapsulation. Physical properties remained constant for all of the encapsulation concentrations.

TABLE 3

| Encapsulation, % | 0 | 1 | 2 | 3 | 4 | 5 |
|---|---|---|---|---|---|---|
| EPDM 1040 MB | 256 | 256 | 256 | 256 | 256 | 256 |
| Resin D | 1 | 1 | 1 | 1 | 1 | 1 |
| DiCup 40 KE | 7.5 | 7.5 | 7.5 | 7.5 | 7.5 | 7.5 |
| ZDA (SR111) | 10 | 10 | 10 | 10 | 10 | 10 |
| Plate-out | severe | some | some-slight | slight | slight | slight |
| Dusting | severe | none | none | none | none | none |
| Incorporation Time | long | long | short | short | short | short |
| ODR, 320° F. | | | | | | |
| ML, IN LB | 6.5 | 7.0 | 7.1 | 7.2 | 5.5 | 6.5 |
| Ts2, MIN | 1.9 | 1.8 | 1.4 | 1.7 | 1.9 | 1.7 |
| Tc (90) MIN | 9.8 | 10.6 | 11.7 | 10.5 | 11.0 | 10.8 |
| MH, IN LB | 36.3 | 38.8 | 33.2 | 37.9 | 34.3 | 36.7 |
| Hardness, Shore A | | | | | | |
| Peak Tensile, PSI | 1390 | 1380 | 1370 | 1350 | 1370 | 1320 |
| Elongation, % | 590 | 700 | 740 | 640 | 590 | 550 |
| Modulus 100 PSI | 230 | 220 | 200 | 200 | 230 | 220 |

Although the invention has been described in sufficient detail, various modifications, alternatives, and improvements should become readily apparent without departing from the spirit and scope of the invention.

What is claimed is:

1. A composition comprising MA$_n$ salt in particulate form having improved dispersibility in elastomers, wherein M is a metal selected from zinc, calcium, magnesium, potassium, sodium, lithium., iron, zirconium, aluminum, barium and bismuth;

A is acrylate or methacrylate; and n is 1–4; said salt encapsulated with a polymer selected from the group consisting of polybutadiene, hydroxy-terminated polybutadiene, polybutadiene dimethacrylate, ethylene-butylene diacrylate, natural rubber, polybutene, and EPDM;

wherein said polymer encapsulates said salt upon drying a polymeric solution comprising said salt, said polymer and an organic solvent.

2. The composition according to claim 1 wherein the ratio of said elastomer to said MA$_n$ salt is about 1 to 10% based on weight of said salt.

3. The composition according to claim 1 wherein said salt is zinc diacrylate and said elastomer is hydroxy-terminated polybutadiene.

4. A composition comprising an elastomer having dispersed therein an $MA_n$ salt in particulate form according to claim 1.

5. The composition according to claim 4 wherein said elastomer is selected from the group consisting of polybutadiene, hydroxy-terminated polybutadiene, EPDM, polybutadiene dimethacrylate, polybutadiene diacrylate, ethylene-propylene diacrylate, natural rubber, and polybutene.

6. The composition according to claim 5 wherein said polymer is polybutadiene and said elastomer is polybutadiene, said M is zinc, A is acrylate, and n is 2.

* * * * *